(12) United States Patent
Yamada et al.

(10) Patent No.: US 6,341,263 B1
(45) Date of Patent: Jan. 22, 2002

(54) SPEECH RECOGNITION APPARATUS, METHOD AND STORAGE MEDIUM THEREOF

(75) Inventors: Eiko Yamada; Hiroaki Hattori, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/312,886

(22) Filed: May 17, 1999

(30) Foreign Application Priority Data

May 15, 1998 (JP) .................................... 10-132788

(51) Int. Cl.[7] .............................................. G01L 15/00

(52) U.S. Cl. ...................... 704/239; 704/246; 704/247; 704/248

(58) Field of Search ............................. 704/239, 243, 704/244, 245, 246, 247, 248

(56) References Cited

U.S. PATENT DOCUMENTS

| 5,347,612 | A | * | 9/1994 | Fujimoto et al. | 704/243 |
| 5,687,287 | A | * | 11/1997 | Gandhi et al. | 704/247 |
| 6,061,652 | A | * | 5/2000 | Tsuboka et al. | 704/245 |
| 6,094,632 | A | * | 7/2000 | Hattori | 704/239 |
| 6,205,424 | B1 | * | 3/2001 | Goldenthal et al. | 704/247 |
| 6,272,463 | B1 | * | 8/2001 | Lapere | 704/248 |

* cited by examiner

*Primary Examiner*—Tālivaldis Ivars Šmits
*Assistant Examiner*—Susan McFadden
(74) *Attorney, Agent, or Firm*—Whitham, Curtis & Christofferson, P.C.

(57) ABSTRACT

A voice recognition system, method and storage medium is provided. The system includes a plurality of storage sections, a selection section, an adaptation section, a plurality of calculation sections, an adaptation section, a normalization section and a decision section. The method includes the steps for performing the functions associated with the sections.

16 Claims, 4 Drawing Sheets

FIG. 4

SPEECH RECOGNITION APPARATUS, METHOD AND STORAGE MEDIUM THEREOF

BACKGROUND OF THE INVENTION

The present invention relates to a speaker collation apparatus, a method, and a storage medium, and particularly to a speaker collation apparatus, a method, and a storage medium characterized by generation of a standard pattern of inhibition speakers to prepare the standard pattern of inhibition speakers.

A big problem in speaker collation is that differences in ambient noise and difference in line characteristics (environmental differences) in registration and collation decrease the ratio of collation. The method for solving such problem is exemplified by likelihood normalization method on the basis of the standard pattern of inhibition speakers, proposed by Higgins, Rosenberg, and Matsui et al. These examples are A. Higgins, L, Bahler, and J. Porter; "Speaker collation using randomized phrase prompting," digital signal processing, 1, pp. 89–106 (1991) as the Reference 1; A. E. Rosenberg, Joel Delong, Chin-Hui Lee, Biing-Hweng Juang, Frank K. Soong: "The Use of cohort normalized scores for speaker collation." ICSLP 92, PP. 599–602 (1992), as the Reference 2; Tomoko Matsui, Sadaoki Furui: "Speaker adaptation of tied-mixture-based phoneme models for text-prompted speaker recognition" ICASSP 94, pp. 125–128 (1994) as the Reference 3.

A likelihood normalization method on the basis of the standard pattern of inhibition speakers is a method to normalize a likelihood by subtracting likelihood (likelihood of inhibition speakers) between an inputted voice and the standard pattern of inhibition speakers from a likelihood (likelihood of the identical person) between an inputted voice and the standard pattern of the identical person. Likelihood not easily affected by environmental differences can be acquired by subtraction of likelihood of inhibition speakers from the likelihood of the identical person, because environmental differences in registration and collation affect both of the likelihood of the identical person and likelihood of inhibition speakers. Known methods for selection of inhibition speakers are a method for selecting inhibition speakers similar to a voice of the identical person in registration and a method for selecting inhibition speakers similar to an inputted voice in collation. The former method is detailedly described in the Reference 2 and the latter method is detailedly described in the Reference 1 and the Reference 3.

In the likelihood normalization method using the standard pattern of inhibition speakers, a good ratio of collation can be acquired in environmental differences as small as possible in registered voice, collated voice and of the standard pattern of inhibition speakers. It is a problem that a large difference in these environmental differences reduces the ratio of collation. In order to solve the problem, many standard patterns of the candidates of inhibition speakers must be previously prepared for respective environments in registration and collation.

However, it is difficult to prepare many standard patterns of the candidates of inhibition speakers for respective environments. Therefore, a method for acquiring a good ratio of collation is required without necessity of preparing the standard patterns of the candidates of inhibition speakers for respective environments.

For a solving method in the case of a large difference in environment between registered voice and the standard pattern of inhibition speakers, a method of normalization of likelihood is proposed by adapting the standard pattern of inhibition speakers using registered voice, by acquiring likelihood (likelihood of inhibition speakers) between the adapted reducing standard pattern and the collated voice, and by subtracting the likelihood of inhibition speakers from the likelihood's of the collated voice and the standard pattern of the identical person.

This method is a method for reducing environmental differences between registered voice and the standard pattern of inhibition speakers by adapting the standard pattern of inhibition speakers on the basis of the voice of the identical person in registration. This method is an effective method in selecting inhibition speakers in registration; and detailedly described in Yamada and Hattori of the reference 4 (a method and a system of generation of a reducing standard pattern namely cohort in speaker recognition and a speaker collation apparatus including the system. Japanese Patent Application No. 1997–040102).

SUMMARY OF THE INVENTION

It is therefore an object of the present invention to provide a speaker collation apparatus, method, and storage medium capable of acquiring a high ratio of collation without previous generation of the standard patterns of the candidates of inhibition speakers for many environments in a method for selection of the standard patterns of inhibition speakers in collation.

Other objects of the present invention will become clear as the description proceeds.

According to an aspect of the present invention, there is provided a speaker collation apparatus comprising; an analysis section for converting an inputted voice data for collation to a characteristic vector, a storage section of the characteristic vector for storing the characteristic vector converted in said analysis section, a storage section of a standard pattern of candidates of inhibition speakers in which one or more standard patterns of candidates of inhibition speakers have been stored, a selection section for selecting at least one inhibition speaker by calculating similarity degree between the characteristic vector converted in said analysis section and the standard patterns of respective speakers stored in said storage section of the standard pattern of candidates of inhibition speakers, an adaptation section for adapting the standard patters of inhibition speakers by acquiring a mapping function from a characteristic vector space of a voice of a inhibition speaker to a characteristic vector space of an inputted voice by using the mapping function acquired, using the standard pattern of inhibition speakers selected in said selection section to select a inhibition speaker and the characteristic vector stored in said storage section for the characteristic vector, a calculation section of a similarity degree of inhibition speakers for calculating the similarity degree between a characteristic vector stored in said storage section of characteristic vector and the standard pattern of inhibition speakers adapted in said adaptation section, a storage section of the standard pattern of the identical person in which the registered standard pattern of the identical person has been stored, a calculation section of a similarity degree to the identical person for calculating the similarity degree between of the characteristic vector stored in said storage section for the characteristic vector and the standard pattern of the identical person stored in said storage section of the standard pattern of the identical person, a normalization section of the similarity degree for normalizing the similarity degree by using the similarity degree calculated in said calculation section of a similarity degree to the identical person and the similarity degree calculated in said calculation section of a similarity degree of inhibition speakers, a threshold value storage section for storing a threshold value previously determined. and a decision section for deciding the person by using the similarity degree normalized in said normalization section of the similarity degree and the threshold value stored in said storage section got storing a threshold value.

The speaker collation apparatus may further comprise; a normalization section for normalizing said characteristic vector converted in said analysis section, said standard pattern of a candidate of inhibition speakers stored in said storage section of said standard pattern of the candidate of inhibition speakers, and said standard pattern of the identical person stored in said storage section of the standard pattern of the identical person.

According to another aspect of the present invention, there is also provided a speaker collation apparatus, comprising; an analysis section for converting an inputted voice data for collation to a characteristic vector, a storage section of the characteristic vector for storing the characteristic vector converted in said analysis section, a storage section of a standard pattern of candidates of inhibition speakers in which one or more standard patters of candidates of inhibition speakers have been stored, an adaptation section for adapting the standard patters of a speaker by acquiring a mapping function from a characteristic vector space of a voice of respective speakers to a characteristic vector space of an inputted voice using all standard patterns of speakers stored in said storage section of a standard pattern of said candidates of inhibition speakers and the characteristic vector stored in said storage section for said characteristic vector in order to use the mapping function acquired, a selection section of inhibition speakers for selecting at least one inhibition speaker by calculating a similarity degree between the characteristic vector converted in said analysis section and the standard patterns of speakers adapted in said adaptation section, a calculation section of a similarity degree of inhibition speakers in order for calculating the similarity degree between a characteristic vector stored in said storage section of characteristic vector and said standard pattern of inhibition speakers selected in said selection section of inhibition speakers, a storage section of the standard pattern of the identical person in which the registered standard pattern of the identical person has been stored a calculation section of a similarity degree of the identical person for calculating the similarity degree between the characteristic vector stored in said storage section for the characteristic vector and the standard pattern of the identical person stored in said storage section of the standard pattern of the identical person, a normalization section of the similarity degree for normalizing the similarity degree by using the similarity degree calculated in said calculation section of a similarity degree to the identical person and the similarity degree calculated in said calculation section of a similarity degree of inhibition speakers, a threshold value storage section for storing a threshold value previously determined, and a decision section for deciding the person by using the similarity degree normalized in said normalization section of the similarity degree and the threshold value stored in said storage section to store a threshold value.

The speaker collation apparatus may further comprise; a normalization section for normalizing said characteristic vector converted in said analysis section, said standard pattern of a candidate of inhibition speakers stored in said storage section of said standard pattern of the candidate of inhibition speakers, and said standard pattern of the identical person stored in said storage section of the standard pattern of the identical person.

According to yet another aspect of the present invention, there is provided a method of collating a speaker, said method comprising the steps of: calculating a similarity degree between a characteristic vector acquired from a collated voice and a standard pattern of respective speakers stored in a storage section for a standard pattern of candidates of inhibition speakers; selecting at least one inhibition speaker; acquiring a mapping function from a characteristic vector space of a standard pattern of inhibition speakers to a characteristic vector space of a collated voice; adapting the standard pattern of inhibition speakers by using the mapping function acquired; calculating a likelihood of inhibition speakers based on the likelihood between the adapted standard pattern of inhibition speakers and the collated voice; calculating the likelihood of the identical person based on the likelihood between the standard pattern of the identical person and the collated voice; acquiring a likelihood of normalization by subtracting said likelihood of inhibition speakers from said likelihood of the identical person; and decideing the person based on the likelihood of normalization.

The step of selecting at least one inhibition speaker may be carried out by any one of such methods of selection as N persons, random N persons, N persons around M percentile in the order of high degree of likelihood.

According to yet another aspect of the present invention, there is also provided a method of collating a speaker, said method comprising the steps of: normalizing a characteristic vector of an input for collation, said standard pattern of candidates of inhibition speakers, and said standard pattern of the identical person; calculating a likelihood between a normalized standard pattern of candidates of inhibition speakers and a normalized characteristic vector; selecting inhibition speakers;

acquiring a mapping function from a characteristic vector space of a, standard pattern of selected inhibition speakers to a characteristic vector space of a collated voice; adapting the standard pattern of inhibition speakers by using the mapping function obtained; calculating a likelihood of inhibition speakers based on the likelihood between the adapted standard pattern of inhibition speakers and the collated voice, calculating the likelihood of the identical person based on the likelihood between the normalized standard pattern of the identical person and the normalized characteristic vector; calculating a likelihood of normalization by subtracting said likelihood of inhibition speakers from said likelihood of the identical person; and deciding the person based on the likelihood of normalization.

The step of selecting inhibition speakers may be carried out by any one of such methods of selection as N persons, random N persons, N persons around M percentile in the order of high degree of likelihood.

According to yet another aspect of the present invention, there is also provided a method of collating a speaker, said method comprising the steps of: acquiring a mapping function from a characteristic vector space of a standard pattern of all candidates of inhibition speakers to a characteristic vector space of a collated voice; adapting the standard pattern of the candidates of inhibition speakers by using respective mapping function known; calculating a likelihood between the adapted standard pattern of the candidates of inhibition speakers and the featured vector; selecting inhibition speakers; calculating a likelihood of inhibition speakers based on the likelihood between the selected standard pattern of inhibition speakers and the collated voice; calculating the likelihood of the identical person based on the likelihood between the standard pattern of the identical person and the collated vector, calculating a likelihood of normalization by subtracting said likelihood of inhibition speakers from said likelihood of the identical person; and deciding the person based on the likelihood of normalization.

The step of selecting inhibition speakers may be carried out by any one of such methods of selection as N persons, random N persons, N persons around M percentile in the order of high degree of likelihood.

According to yet another aspect of the present invention, there is also provided a method of collating a speaker, said method comprising the steps of: acquiring a mapping function from a characteristic vector space of normalized standard patterns of all candidates of inhibition speakers to a characteristic vector space of the normalized collated voice; adapting the standard pattern of the candidates of inhibition speakers by using the mapping function acquired; selecting inhibition speakers by acquiring a likelihood between the adapted standard pattern of the candidates of inhibition speakers and the featured vector; calculating a likelihood of inhibition speakers based on the likelihood between the selected standard pattern of inhibition speakers and the collated voice; calculating the likelihood of the identical person based on the likelihood between the normalized standard pattern of the identical person and the normalized collated vector; calculating a likelihood of normalization by subtracting said likelihood of inhibition speakers from said likelihood of the identical person; and deciding the person based on the likelihood of normalization.

The step of selecting inhibition speakers may be carried out by any one of such methods of selection as N persons, random N persons, N persons around M percentile in the order of high degree of likelihood.

According to still another aspect of the present invention, there is provided a computer readable memory medium for storing a program of collating a speaker, said program comprising: calculating a similarity degree between a characteristic vector acquired from a collated voice and a standard pattern of respective speakers stored in a storage section for a standard pattern of candidates of inhibition speakers; selecting at least one inhibition speaker; acquiring a mapping function from a characteristic vector space of a standard pattern of inhibition speakers to a characteristic vector space of a collated voice; adapting the standard pattern of inhibition speakers by using the mapping function acquired; calculating a likelihood of inhibition speakers based on the likelihood between the adapted standard pattern of inhibition speakers and the collated voice; calculating the likelihood of the identical person based on the likelihood between the standard pattern of the identical person and the collated voice; acquiring a likelihood of normalization by subtracting said likelihood of inhibition speakers from said likelihood of the identical person; and decideing the person based on the likelihood of normalization.

According to still another aspect of the present invention, there is provided a computer readable memory medium for storing a program of collating a speaker, said program comprising: normalizing a characteristic vector of an input for collation, said standard pattern of candidates of inhibition speakers, and said standard pattern of the identical person, calculating a likelihood between a normalized standard pattern of candidates of inhibition speakers and a normalized characteristic vector; selecting inhibition speakers; acquiring a mapping function from a characteristic vector space of a standard pattern of selected inhibition speakers to a characteristic vector space of a collated voice; adapting the standard pattern of inhibition speakers by using the mapping function obtained; calculating a likelihood of inhibition speakers based on the likelihood between the adapted standard pattern of inhibition speakers and the collated voice; calculating the likelihood of the identical person based on the likelihood between the normalized standard pattern of the identical person and the normalized characteristic vector; calculating a likelihood of normalization by subtracting said likelihood of inhibition speakers from said likelihood of the identical person; and deciding the person based on the likelihood of normalization.

According to still another aspect of the present invention, there is also provided a computer readable memory medium for storing a program of collating a speaker, said program comprising: acquiring a mapping function from a characteristic vector space of a standard pattern of all candidates of inhibition speakers to a characteristic vector space of a collated voice; adapting the standard pattern of the candidates of inhibition speakers by using respective mapping function known; calculating a likelihood between the adapted standard pattern of the candidates of inhibition speakers and the featured vector; selecting inhibition speakers; calculating a likelihood of inhibition speakers based on the likelihood between the selected standard pattern of inhibition speakers and the collated voice; calculating the likelihood of the identical person based on the likelihood between the standard pattern of the identical person and the collated vector; calculating a likelihood of normalization by subtracting said likelihood of inhibition speakers from said likelihood of the identical person; and deciding the person based on the likelihood of normalization.

According to still another aspect of the present invention, there is also provided a computer readable memory medium for storing a program of collating a speaker, said program comprising: acquiring a mapping function from a characteristic vector space of normalized standard patterns of all candidates of inhibition speakers to a characteristic vector space of the normalized collated voice; adapting the standard pattern of the candidates of inhibition speakers by using the mapping function acquired; selecting inhibition speakers by acquiring a likelihood between the adapted standard pattern of the candidates of inhibition speakers and the featured vector; calculating a likelihood of inhibition speakers based on the likelihood between the selected standard pattern of inhibition speakers and the collated voice; calculating the likelihood of the identical person based on the likelihood between the normalized standard pattern of the identical person and the normalized collated vector; calculating a likelihood of normalization by subtracting said likelihood of inhibition speakers from said likelihood of the identical person; and deciding the person based on the likelihood of normalization.

DETAILED DESCRIPTION OF THE PREFERRED EMBODIMENTS

The followings are the description of preferred embodiments of the speaker collation apparatus, method, and storage medium of the invention with reference to drawings.

First, in the method for speaker collation of the first invention, inhibition speakers are selected and a mapping function from a characteristic vector space of a standard pattern of inhibition speakers to a characteristic vector space of a collated voice is acquired, the standard pattern of inhibition speakers was adapted by using the mapping function obtained, a likelihood (likelihood of inhibition speakers) between the adapted standard pattern of the inhibition speakers and the collated voice is calculated. For this method for adaptation, the high speed environment adaptation (REALISE method) (detailedly described by Takagi et al. of the reference 5: voice recognition having environmental adaptation function by a spectrum mapping. Onkyou Kouron: 173–174. 1994–3) the speaker adaptation of tree structure (ACTS) (detailedly described by Sinoda et al. of the reference 6: speaker adaptation by using probability distribution having a tree structure. Onkyou Kouron: 49–50. 1995–3,) and the spectrum interpolation speaker adaptation (detailedly described by Sinoda et al. of the reference 7: speaker adaptation for voice recognition by using deem-syllable HMM. Onkyou Kouron: 23–24. 1991–9,) and Ceptrum mean equalization (CME.)

Next, a likelihood (likelihood of the identical person) between the standard pattern of the identical person and the collated voice is calculated, and a likelihood of normalization is calculated by subtracting said likelihood of inhibition speakers from said likelihood of the identical person. Adaptation of the standard pattern of inhibition speakers carried out by using a collated voice in this method allows acquiring the standard pattern of inhibition speakers in an environment similar to that of collation and therefore, allows acquiring a high ratio of collation without previous generation of the standard patterns of the candidates of inhibition speakers for identical environment to that of collation.

In the method for speaker collation of the second invention, a characteristic vector, the standard pattern of candidates of inhibition speakers, and said standard pattern of the identical person, all of that have been first analyzed, are normalized. The normalizing method applied herewith is a method for correction of frequency characteristics of phonation or the standard pattern. The method provides a small freedom in adaptation in comparison with the adapting method applied in the first method and shows a low degree of adaptation. For normalizing method, Ceptrum mean subtraction (CMS) and secondary normalization (detailedly described by Yamada et al. of the reference 8: An evaluation of spectrum normalization not easily affected by a difference in voice inputting system. Onkyou Kouron: 145–146. 1994–3) can be applied. Next, inhibition speakers are selected by acquiring a likelihood between the normalized standard pattern of the candidates of inhibition speakers and the normalized featured vector. Subsequently, a mapping function from a characteristic vector space of a standard pattern of the selected inhibition speakers to a characteristic vector space of a collated voice is acquired, the standard pattern of inhibition speakers is adapted by using the mapping function obtained, and a likelihood (likelihood of inhibition speakers) between the adapted standard pattern of the inhibition speakers and the collated voice is calculated. The normalizing method is identical to that of the first invention.

Following to these steps, a likelihood (likelihood of the identical person) between the normalized standard pattern of the identical person and the normalized characteristic vector is calculated, and a likelihood of normalization is calculated by subtracting the likelihood of inhibition speakers from the likelihood of the identical person. Adaptation of the standard pattern of inhibition speakers is carried out in this method by using the collated voice following to decrease an environmental difference between a registered voice and the collated voice by normalizing the registered standard pattern of the identical person and the characteristic vector of the collated voice, and on the basis of this step, the environmental difference between the collated voice and the standard pattern of inhibition speakers is decreased. Applying this method allows acquiring a high ratio of collation without previous generation of the standard patterns of the candidates of inhibition speakers for identical environment to respective collation even in the case of a large environmental difference between registration and collation.

In the speaker collation method of the third invention, a mapping function from a characteristic vector space of all standard patterns of candidates of inhibition speakers to a characteristic vector space of a collated voice is first acquired, and the standard pattern of candidates of inhibition speakers is adapted by using respective mapping function known. The method for adaptation is identical to that of the first invention.

Next, a likelihood between the adapted standard pattern of the candidates of inhibition speakers and the featured vector is calculated, inhibition speakers are selected, a likelihood of inhibition speakers is the likelihood between the selected standard pattern of inhibition speakers and the collated voice, and the likelihood (the likelihood of the identical person) between the standard pattern of the identical person and the collated voice is calculated, a likelihood of normalization is calculated by subtracting the likelihood of inhibition speakers from the likelihood of the identical person. In this method, inhibition speakers is selected by using the adapted standard pattern of the candidates of inhibition speakers and, therefore the standard pattern of inhibition speakers can be generated with a higher precision.

In the method for speaker collation of the fourth inventions a mapping function from a characteristic vector space of normalized standard patterns of all candidates of inhibition speakers to a characteristic vector space of the normalized collated voice is first acquired, the standard pattern of the candidates of inhibition speakers is adapted by using the mapping function acquired. The method for adaptation is identical to that of the first invention. the method for normalization is identical to that of the second invention. Next, a likelihood between the adapted standard pattern of the candidates of inhibition speakers and the featured vector, inhibition speakers are selected, and a likelihood of inhibition speakers is the likelihood between the selected standard pattern of inhibition speakers and the collated voice. Subsequently, a likelihood (likelihood of the identical person) between the normalized standard pattern of the identical person and the normalized collated vector is calculated, and the normalized likelihood is calculated by subtracting the likelihood of inhibition speakers from the likelihood of the identical person. This method is effective even in the case of a large environmental difference between registration and collation, Therefore, the standard pattern of inhibition speakers can be generated with a higher precision by selection of inhibition speakers using the adapted standard pattern of inhibition speakers.

For the method for selection of inhibition speakers applied to said first to said fourth inventions, any one of such methods of selection as N persons, random N persons, N persons around M percentile can be used in the order of high degree of likelihood. The likelihood of inhibition speakers can be calculated by using a method to calculate the mean of N of likelihoods. The scale of similarity degree has been herewith described with likelihood as an example, however, the same description is also applied to conversion to a distance.

Herewith, the preferred embodiment of a speaker collation apparatus by using a method for speaker collation according to the present invention will be described below with reference to the drawings.

Figure 1:
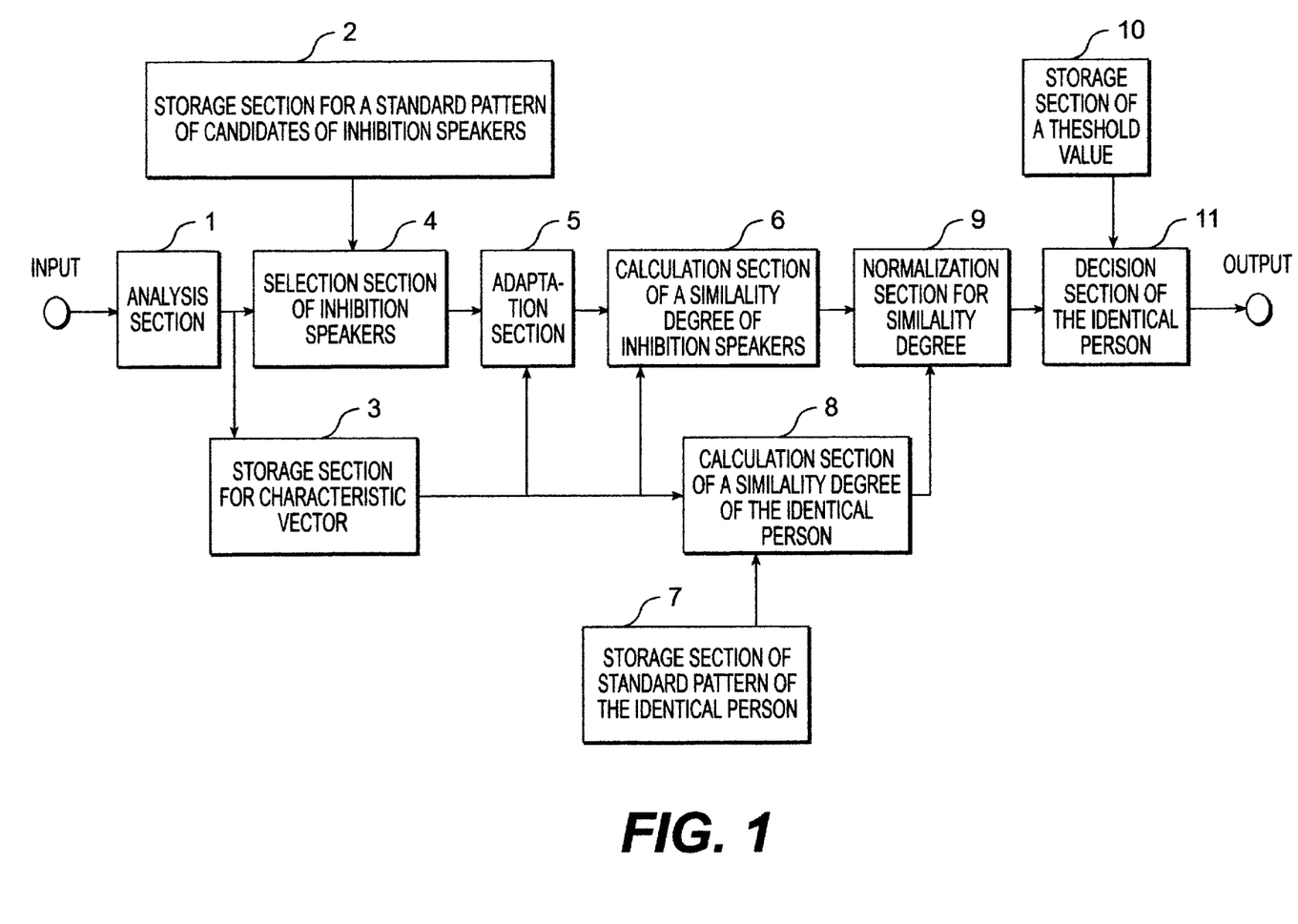
FIG. 1 is a constitutional block diagram of a speaker collation apparatus of the present first invention.

FIG. 1 is a constitutional block diagram of a mode of carrying out the present first invention, A collated voice inputted is converted to a characteristic vector in an analysis section 1. The characteristic vector used is exemplified by cepstrum and Δ cepstrum (detailedly described by Hurui of the reference 9: Digital voice processing. Toukai Daigaku Syuppan Kai: 44–47. 1985.) The characteristic vector analyzed is sent to a storage section 3 for the characteristic vector and a selection section 4 for selecting a inhibition speaker. In the selection section 4 for selecting a inhibition speaker, a similarity degree between the characteristic vector sent and the standard patterns of inhibition speakers stored in the storage section 2 of the standard pattern of candidates of inhibition speakers is calculated. The calculating method of similarity degree used are exemplified by Viterbi algorithms (detailedly described by Nakagawa of the reference 10: Voice recognition by probability model. THE JOURNAL OF THE INSTITUTE OF ELECTRONICS, INFORMATION AND COMMUNICATION ENGINEERS 1988) and DP matching (detailedly described by Sakoe of the reference 11: Voice recognition by path constraints of DP matching. Onkyou Kouron: 67–68. 1974.) The similarity degree calculated is sorted in a descending order to select N persons of the highest orders as inhibition speakers. There are other methods usable for selection such as a method for selecting randomly N persons and a method for selecting N persons around M percentile of similarity degree distribution. The standard pattern of the selected inhibition speakers is sent to the adaptation section 25.

In the adaptation section 5, a mapping function from a characteristic vector space of the standard patterns of inhibition speakers, to a characteristic vector space of the collated voice is acquired by using the standard pattern of inhibition speakers sent from the selection section 4 for selecting a inhibition speaker and the characteristic vector sent from storage section 3 for the characteristic vector. For the method for acquiring mapping function, the function is obtained according to the formula (2) and formula (3) of reference 5 min the case of the high speed environment adaptation, the formula (1) of reference 6 in the case of the speaker adaptation of tree structure, and the formula (1) of reference 7 in the case of the spectrum interpolation speaker adaptation. The standard patterns of inhibition speakers is adapted by using the mapping function known by such methods. The adapted standard patterns of inhibition speakers is sent to the calculation section 6 of a similarity degree of inhibition speakers.

In the calculation section 6 of a similarity degree of inhibition speakers, the similarity degree between N of the adapted standard patterns of inhibition speakers and a characteristic vector sent from the storage section 3 of characteristic vector is calculated, The methods used for calculation of similarity degree are exemplified by Viterbi algorithms and DP matching. The mean of N of similarities (similarity degree of inhibition speakers) is calculated and sent to the normalization section 9 for similarity degree.

In the calculation section 8 for the similarity degree of the identical person, the similarity degree (similarity degree of the identical person) between the standard pattern of the identical person sent from the storage section 7 of the standard pattern of the identical person and the characteristic vector sent from the storage section 3 for the characteristic vector is calculated. The calculated similarity degree of the identical person is sent to the similarity degree normalization section 9.

In the normalization section 9 for similarity degree, the normalization of similarity degree is carried out by subtracting the similarity degree of inhibition speakers sent from the calculation section 6 of a similarity degree of inhibition speakers from the similarity degree to the identical person sent from the calculation section 8 for the similarity degree of the identical person. The normalized similarity degree is sent to the decision section 11 to decide the person.

In the decision section 11 for deciding the person, identification of the person is carried out by using the normalized similarity degree sent from the normalization section 9 of the similarity degree and the threshold value sent from the storage section for storing a threshold value. When the similarity degree is the likelihood, the person is decided in the case of the likelihood higher than threshold and the person is not decided in the case of the likelihood lower than threshold. Finally, a result of decision is outputted.

Figure 2:
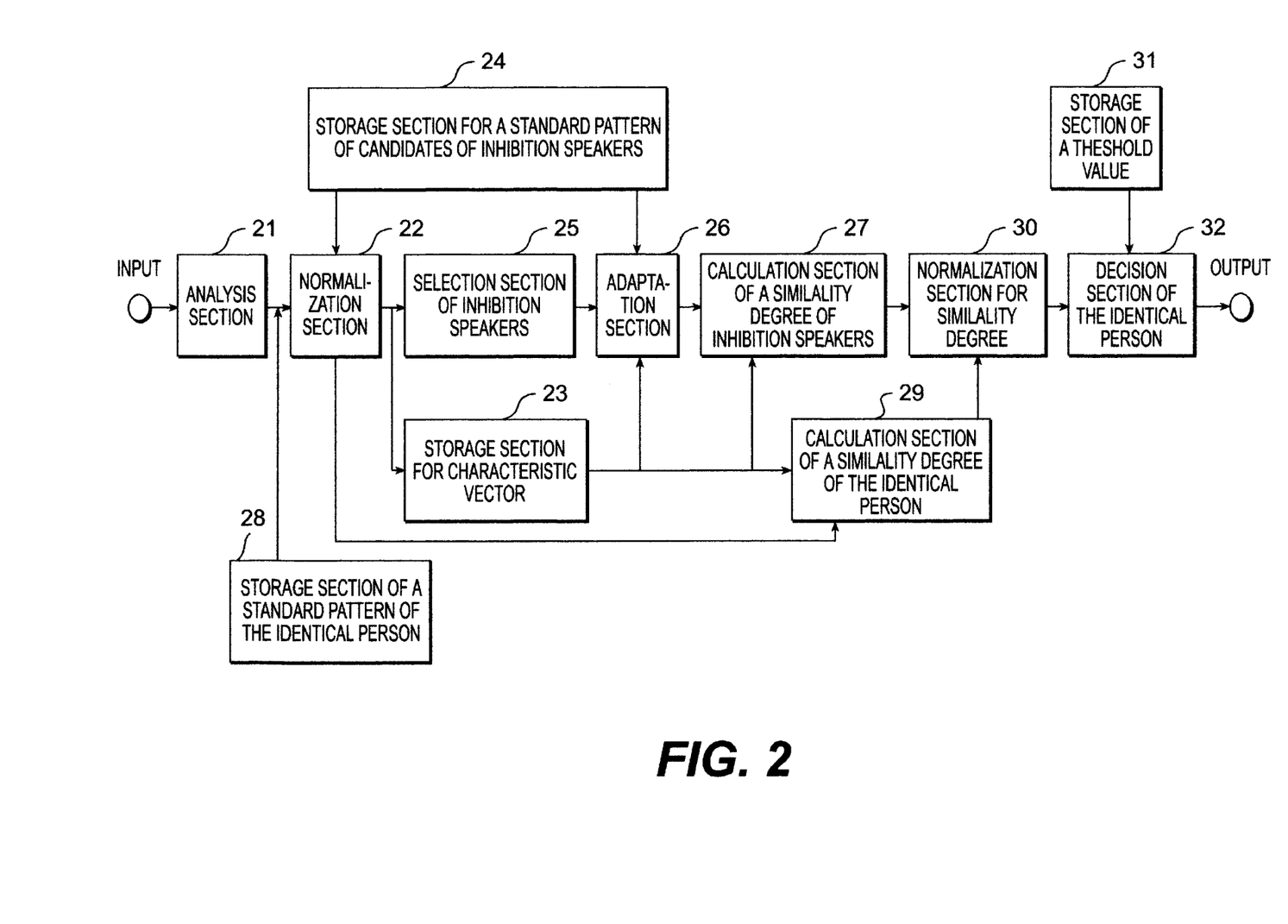
FIG. 2 is a constitutional block diagram of a speaker collation apparatus of the present second invention.

FIG. 2 is a constitutional block diagram of an embodiment of the present second invention.

The collated voice inputted is sent to the analysis section 21 for converting to a characteristic vector. Characteristic vectors used are exemplified by cepstrum and Δ cepstrum. Characteristic vectors analyzed are sent to the normalization section 22 for characteristic vectors.

In the normalization section 22 for characteristic vectors, the characteristic vector sent from the analysis section 21, the standard pattern of candidates of inhibition speakers stored in the storage section 24 for a standard pattern of candidates of inhibition speakers, and the standard pattern of the identical person stored in the storage section 28 for the standard pattern of the identical person are normalized The method of normalization by using the secondary normalization is carried out according to the formula (3) of the reference 8. The normalized characteristic vector is sent to the storage section 23 for characteristic vectors and the selection section 25 of inhibition speakers, the normalized standard pattern of candidates of inhibition speakers is sent to the selection section 25 of inhibition speakers, and the normalized standard pattern of the identical person is sent to the calculation section 29 for the similarity degree of the identical person.

In the selection section 25 of inhibition speakers, similarity degree between the characteristic vector sent and the standard pattern of candidates of inhibition speakers is calculated. The methods for calculation of similarity degree are exemplified by Viterbi algorithms and DP matching. The similarity degree calculated is sorted in a descending order to select N persons of the highest orders as inhibition speakers. There are other methods usable for selection such as a method for selecting randomly N persons and a method for selecting N persons around M percentile of similarity degree distribution. The standard pattern of the selected inhibition speakers is sent to the adaptation section 26.

In the adaptation section 26, a mapping function from a characteristic vector space of the standard patterns of inhibition speakers to a characteristic vector space of the collated voice is acquired by using the standard pattern of inhibition speakers sent from the selection section 25 for selecting a inhibition speaker and the characteristic vector sent from storage section 23 for the characteristic vector. For the method for acquiring mapping function, the function is acquired according to the formula (2) and formula (3) of reference 5 in the case of the high speed environment adaptation, the formula (1) of reference 6 in the case of the speaker adaptation of tree structure, and the formula (1) of reference 7 in the case of the spectrum interpolation speaker adaptation. The standard patterns of inhibition speakers is adapted by using the mapping function known by such methods. The adapted standard patterns of inhibition speakers is sent to the calculation section 27 of a similarity degree of inhibition speakers.

In the calculation section 27 of a similarity degree of inhibition speakers, the similarity degree between N of the adapted standard patterns of inhibition speakers and a characteristic vector sent from the storage section 23 of characteristic vector is calculated. The usable methods for calculation of similarity degree are exemplified by Viterbi algorithms and DP matching. The mean of N of similarities (similarity degree of inhibition speakers) is calculated and sent to the normalization section 30 for similarity degree.

In the calculation section 29 for the similarity degree of the identical person, the similarity degree (similarity degree of the identical person) between the standard pattern of the identical person sent from the normalization section 22 and the characteristic vector sent from the storage section 23 for the characteristic vector is calculated. The calculated similarity degree of the identical person is sent to the normalization section 30 for similarity degree.

In the normalization section 29 for similarity degree, the similarity degree is normalized by subtracting the similarity degree of inhibition speakers sent from the calculation section 27 of a similarity degree of inhibition speakers from the similarity degree to the identical person sent from the calculation section 29 for the similarity degree of the identical person. The similarity degree normalized is sent to the decision section 32 for deciding the person.

In the decision section 32 for deciding the person, the person is decided by using the normalized similarity degree sent from the normalization section 30 of the similarity degree and the threshold value sent from the storage section 31 for storing a threshold value. When the similarity degree is the likelihood, the person is decided in the case of the likelihood higher than threshold value and the person is not decided in the case of the likelihood lower than threshold value. Finally, a result of decision is outputted.

Figure 3:
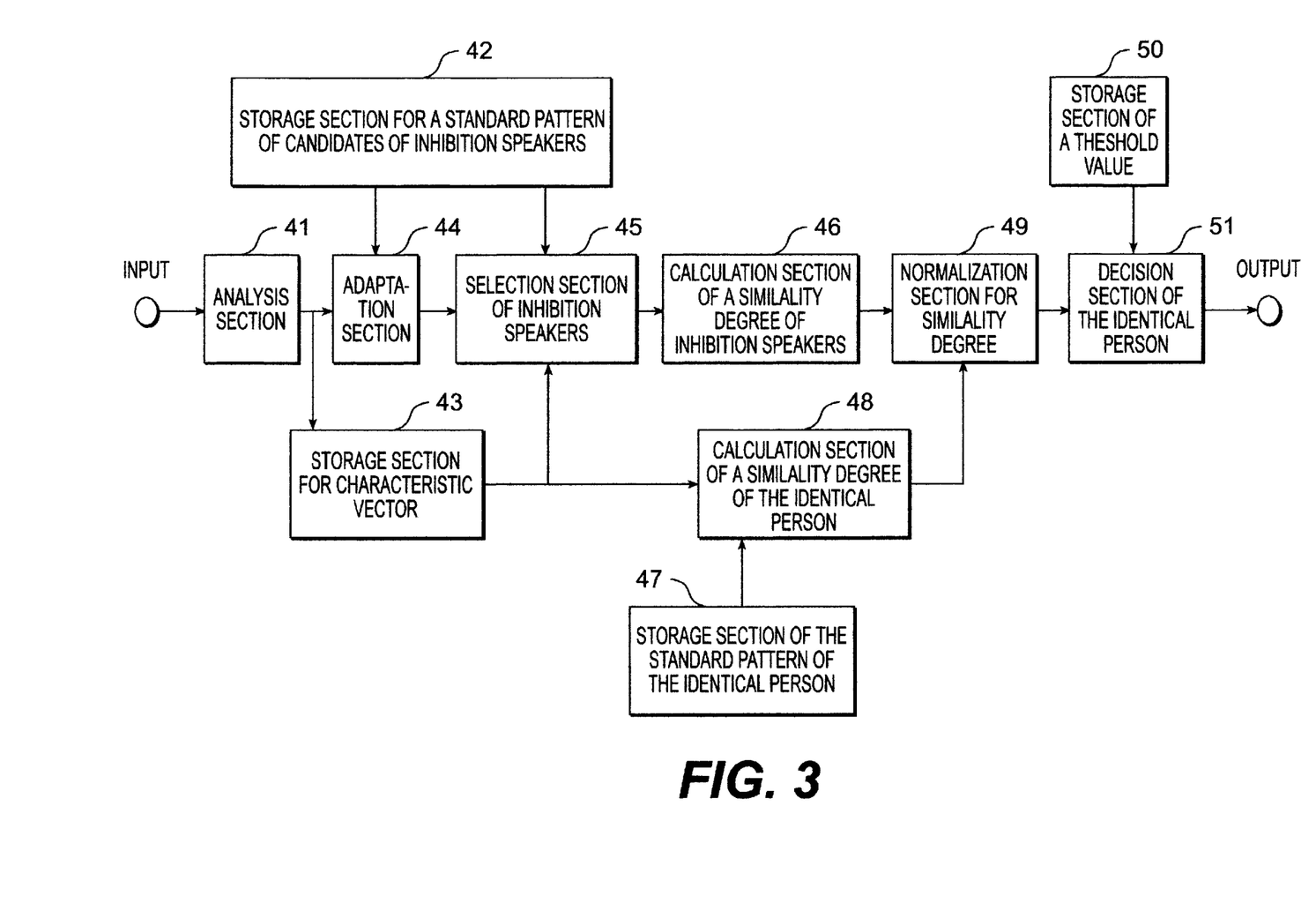
FIG. 3 is a constitutional block diagram of a speaker collation apparatus of the present third invention.

FIG. 3 is a constitutional block diagram of an embodiment of the present third invention.

The collated voice inputted is sent to the analysis section 41 to convert to a characteristic vector. Characteristic vectors used are exemplified by cepstrum and Δ cepstrum. Characteristic vectors analyzed are sent to the storage section 43 for storing characteristic vectors and the adaptation section 44.

In the adaptation section 44, a mapping function from a characteristic vector space of the all standard patterns, that has been stored in the storage section 42 for a standard pattern of candidates of inhibition speakers, of candidates of inhibition speakers to a characteristic vector space of the collated voice sent from the storage section 43 for storing characteristic vectors is obtained. For the method for acquiring mapping function, the function is obtained according to the formula (2) and formula (3) of reference 5 in the case of the high speed environment adaptation, the formula (1) of reference 6 in the case of the speaker adaptation of tree structure, and the formula (1) of reference 7 in the case of the spectrum interpolation speaker adaptation. All the standard patterns of candidates of inhibition speakers is adapted by using respective mapping function obtained by such methods. The adapted standard patterns of candidates of inhibition speakers are sent to the selection section 45 of inhibition speakers.

In the selection section 45 of inhibition speakers, similarity degree between the standard pattern of candidates of inhibition speakers sent from the adaptation section 44 and the characteristic vector sent from the storage section 43 for storing characteristic vectors is calculated. The methods used for calculation of similarity degree are exemplified by Viterbi algorithms and DP matching. The similarity degree calculated is sorted in a descending order to select N persons of the highest orders as inhibition speakers. The similarity degree of the selected inhibition speakers is sent to the calculation section 46 for similarity degree of inhibition speakers.

In the calculation section 46 of a similarity degree of inhibition speakers, the mean of N of similarity degree (the similarity degree of inhibition speakers) sent from the selection section 45 for inhibition speakers is calculated. The mean is sent to the normalization section 49 for similarity degree.

In the calculation section 48 for the similarity degree of the identical person, the similarity degree (similarity degree of the identical person) between the standard pattern of the identical person sent from the storage section 47 of the standard pattern of the identical person and the characteristic vector sent from the storage section 43 for the characteristic vector is calculated. The calculated similarity degree of the identical person is sent to the normalization section 49 for similarity degree.

In the normalization section 49 for similarity degree, the similarity degree is normalized by subtracting the similarity degree of inhibition speakers sent from the calculation section 46 of a similarity degree of inhibition speakers from the similarity degree to the identical person sent from the calculation section 48 for the similarity degree of the identical person. The similarity degree normalized is sent to the decision section 51 to decide the person.

In the decision section 51 to decide the person, the person is decided by using the normalized similarity degree sent from the normalization section 49 of the similarity degree and the threshold value sent from the storage section 50 for storing a threshold value. When the similarity degree is the likelihood, the person is decided in the case of the likelihood higher than threshold value and the person is not decided in the case of the likelihood lower than threshold value. Finally, a result of decision is outputted.

Figure 4:
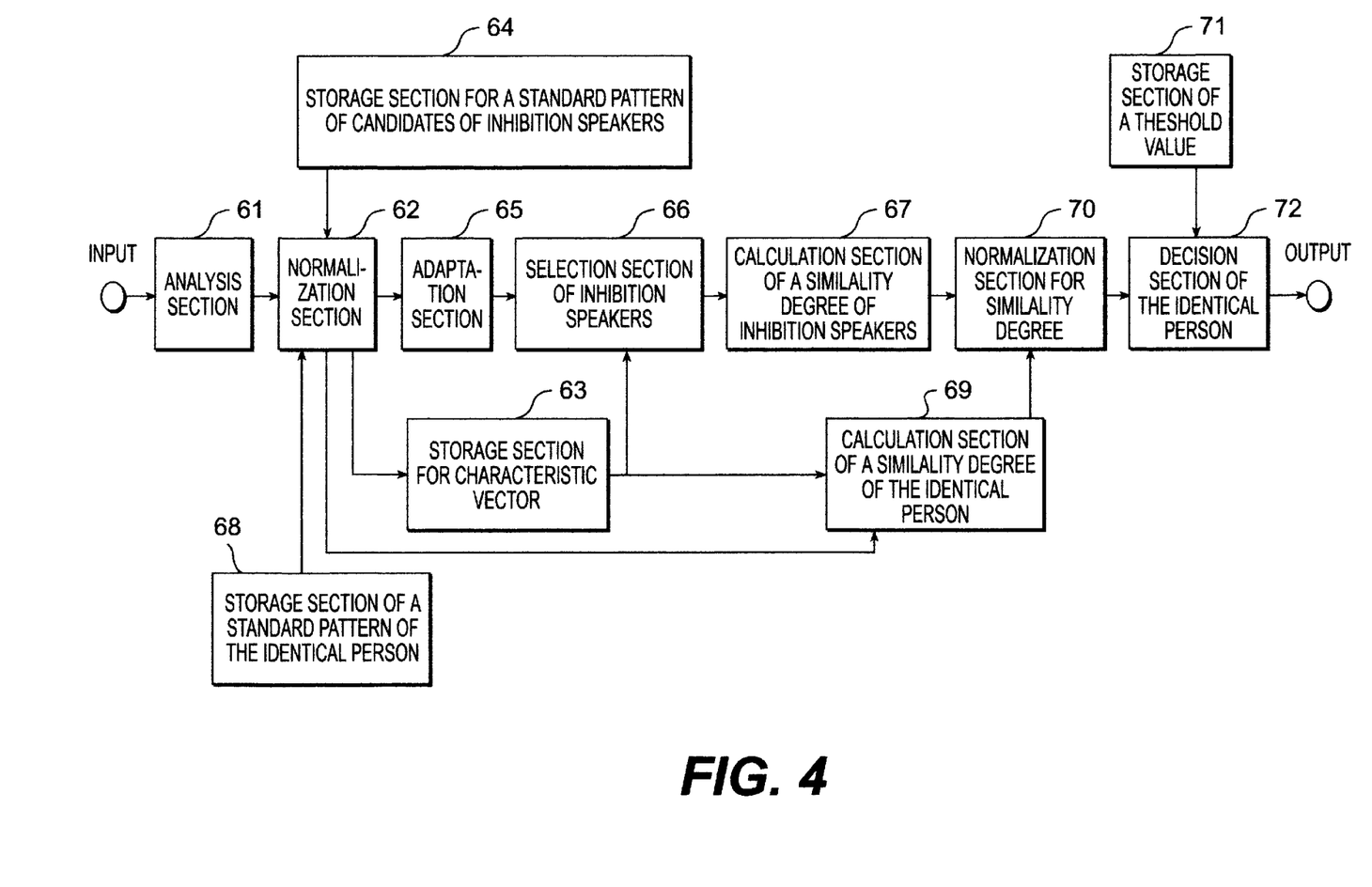
FIG. 4 is a constitutional block diagram of a speaker collation apparatus of the present fourth invention.

FIG. 4 is a constitutional block diagram of an embodiment of the present fourth invention.

The collated voice inputted is sent to the analysis section 61 for converting to a characteristic vector. Characteristic vectors used are exemplified by cepstrum and Δ cepstrum. Characteristic vectors analyzed are sent to the normalization section 62 to store characteristic vectors.

In the normalization section 62 for characteristic vectors, the characteristic vector sent from the analysis section 61, the standard pattern of candidates of inhibition speakers stored in the storage section 64 for a standard pattern of candidates of inhibition speakers, and the standard pattern of the identical person stored in the storage section 68 for the standard pattern of the identical person are normalized. The method of normalization by using the secondary normalization is carried out according to the formula (3) of the reference 8. The normalized characteristic vector is sent to the storage section 63 for characteristic vectors and the adaptation section 65, the normalized standard pattern of candidates of inhibition speakers is sent to the adaptation section 65, and the normalized standard pattern of the identical person is sent to the calculation section 69 for the similarity degree of the identical person.

In the adaptation section 65, a mapping function from the characteristic vector space of the all normalized standard patterns of candidates of inhibition speakers to the normalized characteristic vector space of the collated voice sent from the storage section 63 for storing characteristic vectors is obtained. For the method for acquiring mapping function, the function is obtained according to the formula (2) and formula (3) of reference 5 in the case of the high speed environment adaptation, the formula (1) of reference 6 in the case of the speaker adaptation of tree structure, and the formula (1) of reference 7 in the case of the spectrum interpolation speaker adaptation. All the standard patterns of candidates of inhibition speakers is adapted by using respective mapping function obtained by such methods. The adapted standard patterns of candidates of inhibition speakers are sent to the selection section 66 of inhibition speakers.

In the selection section 66 of inhibition speakers, similarity degree between the standard pattern of candidates of inhibition speakers sent from the adaptation section 65 and the characteristic vector sent from the storage section 63 to store characteristic vectors is calculated. The methods used for calculation of similarity degree are exemplified by Viterbi algorithms and DP matching. The similarity degree calculated is sorted in a descending order to select N persons of the highest orders as inhibition speakers. The similarity degree of the selected inhibition speakers is sent to the calculation section 67 for similarity degree of inhibition speakers.

In the calculation section 67 of a similarity degree of inhibition speakers, the mean value of N of similarity degree (the similarity degree of inhibition speakers) sent from the selection section 66 for inhibition speakers is calculated. The mean value is sent to the normalization section 70 for similarity degree.

In the calculation section 69 for the similarity degree of the identical person, the similarity degree (similarity degree of the identical person) between the normalized standard pattern of the identical person sent from the normalization section 62 and the characteristic vector sent from the storage section 63 for the characteristic vector is calculated. The calculated similarity degree of the identical person is sent to the normalization section 70 for similarity degree.

In the normalization section 70 for similarity degree, the similarity degree is normalized by subtracting the similarity degree of inhibition speakers sent from the calculation section 67 of a similarity degree of inhibition speakers from the similarity degree to the identical person sent from the calculation section 69 for the similarity degree of the identical person. The similarity degree normalized is sent to the decision section 72 to decide the person.

In the decision section 72 to decide the person, the person is decided by using the normalized similarity degree sent from the normalization section 70 of the similarity degree and the threshold value sent from the storage section 71 to store a threshold value. When the similarity degree is the likelihood, the person is decided in the case of the likelihood higher than threshold value and the person is not decided in the case of the likelihood lower than threshold value. Finally, a result of decision is outputted.

As described before, according to the speaker collation apparatus, the method, and the storage medium of the present invention, a high ratio of collation can be acquired without previous generation of the standard patterns of inhibition speakers for identical environment to that of collation even in the case of a large environmental difference between collation and the standard patterns of inhibition speakers While the present invention has thus far been described in conjunction with only several embodiments thereof, it will now be readily possible for those skilled in the art to put this invention into various other manners.

What is claimed is:

1. A speech recognition apparatus comprising;

an analysis section for converting an inputted voice data for collation to a characteristic vector, a storage section of the characteristic vector for storing the characteristic vector converted in said analysis section, a storage section of a standard pattern of candidates of inhibition speakers in which one or more standard patterns of candidates of inhibition speakers have been stored, a selection section for selecting at least one inhibition speaker by calculating similarity degree between the characteristic vector converted in said analysis section and the standard patterns of respective speakers stored in said storage section of the standard pattern of candidates of inhibition speakers, an adaptation section for adapting the standard patterns of inhibition speakers by acquiring a mapping function from a characteristic vector space of a voice of a inhibition speaker to a characteristic vector space of an inputted voice by using the mapping function acquired, using the standard pattern of inhibition speakers selected in said selection section to select a inhibition speaker and the characteristic vector stored in said storage section for the characteristic vector, a calculation section of a similarity degree of inhibition speakers for calculating the similarity degree between a characteristic vector stored in said storage section of characteristic vector and the standard pattern of inhibition speakers adapted in said adaptation section, a storage section of the standard pattern of the identical person in which the registered standard pattern of the identical person has been stored, a calculation section of a similarity degree to the identical person for calculating the similarity degree between of the characteristic vector stored in said storage section for the characteristic vector and the standard pattern of the identical person stored in said storage section of the standard pattern of the identical person, a normalization section of the similarity degree for normalizing the similarity degree by using the similarity degree calculated in said calculation section of a similarity degree to the identical person and the similarity degree calculated in said calculation section of a similarity degree of inhibition speakers, a threshold value storage section for storing a threshold value previously determined, and a decision section for deciding the person by using the similarity degree normalized in said normalization section of the similarity degree and the threshold value stored in said storage section storing a threshold value.

2. A speech recognition apparatus according to claim 1, further comprising a normalization section for normalizing said characteristic vector converted in said analysis section, said standard pattern of a candidate of inhibition speakers stored in said storage section of said standard pattern of the candidate of inhibition speakers, and said standard pattern of the identical person stored in said storage section of the standard pattern of the identical person.

3. A speech recognition apparatus, comprising;
an analysis section for converting an inputted voice data for collation to a characteristic vector,
a storage section of the characteristic vector for storing the characteristic vector converted in said analysis section,
a storage section of a standard pattern of candidates of inhibition speakers in which one or more standard patterns of candidates of inhibition speakers have been stored,
an adaptation section for adapting the standard patterns of a speaker by acquiring a mapping function from a characteristic vector space of a voice of respective speakers to a characteristic vector space of an inputted voice using all standard patterns of speakers stored in said storage section of a standard pattern of said candidates of inhibition speakers and the characteristic vector stored in said storage section for said characteristic vector in order to use the mapping function acquired,
a selection section of inhibition speakers for selecting at least one inhibition speaker by calculating a similarity degree between the characteristic vector converted in said analysis section and the standard patterns of speakers adapted in said adaptation section,
a calculation section of a similarity degree of inhibition speakers in order for calculating the similarity degree between a characteristic vector stored in said storage section of characteristic vector and said standard pattern of inhibition speakers selected in said selection section of inhibition speakers,
a storage section of the standard pattern of the identical person in which the registered standard pattern of the identical person has been stored,
a calculation section of a similarity degree of the identical person for calculating the similarity degree between the characteristic vector stored in said storage section for the characteristic vector and the standard pattern of the identical person stored in said storage section of the standard pattern of the identical person,
a normalization section of the similarity degree for normalizing the similarity degree by using the similarity degree calculated in said calculation section of a similarity degree to the identical person and the similarity degree calculated in said calculation section of a similarity degree of inhibition speakers,
a threshold value storage section for storing a threshold value previously determined, and
a decision section for deciding the person by using the similarity degree normalized in said normalization section of the similarity degree and the threshold value stored in said storage section to store a threshold value.

4. A speech recognition apparatus according to claim 3, further comprising; a normalization section for normalizing said characteristic vector converted in said analysis section, said standard pattern of a candidate of inhibition speakers stored in said storage section of said standard pattern of the candidate of inhibition speakers, and said standard pattern of the identical person stored in said storage section of the standard pattern of the identical person.

5. A method for recognizing a speaker, said method comprising the steps of:
calculating a similarity degree between a characteristic vector acquired from a collated voice and a standard pattern of respective speakers stored in a storage section for a standard pattern of candidates of inhibition speakers;
selecting at least one inhibition speaker;
acquiring a mapping function from a characteristic vector space of a standard pattern of inhibition speakers to a characteristic vector space of a collated voice;
adapting the standard pattern of inhibition speakers by using the mapping function acquired;
calculating a likelihood of inhibition speakers based on the likelihood between the adapted standard pattern of inhibition speakers and the collated voice;
calculating the likelihood of the identical person based on the likelihood between the standard pattern of the identical person and the collated voice;
acquiring a likelihood of normalization by subtracting said likelihood of inhibition speakers, from said likelihood of the identical person; and
deciding the person based on the likelihood of normalization.

6. A method according to claim 5, wherein said step of selecting at least one inhibition speaker is carried out by any one of such methods of selection as N persons, random N persons, N persons around M percentile in the order of high degree of likelihood.

7. A method for recognizing a speaker, said method comprising the steps of:
normalizing a characteristic vector of an input for collation, said standard pattern of candidates of inhibition speakers, and said standard pattern of the identical person;
calculating likelihood between a normalized standard pattern of candidates of inhibition speakers and a normalized characteristic vector;
selecting inhibition speakers;
acquiring a mapping function from a characteristic vector space of a standard pattern of selected inhibition speakers to a characteristic vector space of a collated voice;
adapting the standard pattern of inhibition speakers by using the mapping function obtained;
calculating a likelihood of inhibition speakers based on the likelihood between the adapted standard pattern of inhibition speakers and the collated voice;
calculating the likelihood of the identical person based on the likelihood between the normalized standard pattern of the identical person and the normalized characteristic vector;
calculating a likelihood of normalization by subtracting said likelihood of inhibition speakers from said likelihood of the identical person; and
deciding the person based on the likelihood of normalization.

8. A method according to claim 7, wherein said step of selecting inhibition speakers is carried out by any one of such methods of selection as N persons, random N persons, N persons around M percentile in the order of high degree of likelihood.

9. A method for recognizing a speaker, said method comprising the steps of:

acquiring a mapping function from a characteristic vector space of a standard pattern of all candidates of inhibition speakers to a characteristic vector space of a collated voice;

adapting the standard pattern of the candidates of inhibition speakers by using respective mapping function known;

calculating likelihood between the adapted standard pattern of the candidates of inhibition speakers and the featured vector;

selecting inhibition speakers;

calculating a likelihood of inhibition speakers based on the likelihood between the selected standard pattern of inhibition speakers and the collated voice;

calculating the likelihood of the identical person based on the likelihood between the standard pattern of the identical person and the collated vector;

calculating a likelihood of normalization by subtracting said likelihood of inhibition speakers from said likelihood of the identical person; and deciding the person based on the likelihood of normalization.

10. A method according to claim 9, wherein said step of selecting inhibition speakers is carried out by any one of such methods of select ion as N persons, random N persons, N persons around M percentile in the order of high degree of likelihood.

11. A method for recognizing a speaker, said method comprising the steps of:

acquiring a mapping function from a characteristic vector space of normalized standard patterns of all candidates of inhibition speakers to a characteristic vector space of the normalized collated voice;

adapting the standard pattern of the candidates of inhibition speakers by using the mapping function acquired;

selecting inhibition speakers by acquiring likelihood between the adapted standard pattern of the candidates of inhibition speakers and the featured vector;

calculating a likelihood of inhibition speakers based on the likelihood between the selected standard pattern of inhibition speakers and the collated voice;

calculating the likelihood of the identical person based on the likelihood between the normalized standard pattern of the identical person and the normalized collated vector;

calculating a likelihood of normalization by subtracting said likelihood of inhibition speakers from said likelihood of the identical person; and deciding the person based on the likelihood of normalization.

12. A method according to claim 11, wherein said step of selecting inhibition speakers is carried out by any one of such methods of selection as N persons, random N persons, N persons around M percentile in the order of high degree of likelihood.

13. A computer readable memory medium for storing a program for recognizing a speaker, said program comprising:

calculating a similarity degree between a characteristic vector acquired from a collated voice and a standard pattern of respective speakers stored in a storage section for a standard pattern of candidates of inhibition speakers;

selecting at least one inhibition speaker, acquiring a mapping function from a characteristic vector space of a standard pattern of inhibition speakers to a characteristic vector space of a collated voice;

adapting the standard pattern of inhibition speakers by using the mapping function acquired;

calculating a likelihood of inhibition speakers based on the likelihood between the adapted standard pattern of inhibition speakers and the collated voice;

calculating the likelihood of the identical person based on the likelihood between the standard pattern of the identical person and the collated voice;

acquiring a likelihood of normalization by subtracting said likelihood of inhibition speakers from said likelihood of the identical person; and deciding the person based on the likelihood of normalization.

14. A computer readable memory medium for storing a program for recognizing a speaker, said program comprising:

normalizing a characteristic vector of an input for collation, said standard pattern of candidates of inhibition speakers, and said standard pattern of the identical person;

calculating likelihood between a normalized standard pattern of candidates of inhibition speakers and a normalized characteristic vector;

selecting inhibition speakers; acquiring a mapping function from a characteristic vector space of a standard pattern of selected inhibition speakers to a characteristic vector space of a collated voice;

adapting the standard pattern of inhibition speakers by using the mapping function obtained;

calculating a likelihood of inhibition speakers based on the likelihood between the adapted standard pattern of inhibition speakers and the collated voice;

calculating the likelihood of the identical person based on the likelihood between the normalized standard pattern of the identical person and the normalized characteristic vector;

calculating a likelihood of normalization by subtracting said likelihood of inhibition speakers from said likelihood of the identical person; and deciding the person based on the likelihood of normalization.

15. A computer readable memory medium for storing a program for recognizing a speaker, said program comprising:

acquiring a mapping function from a characteristic vector space of a standard pattern of all candidates of inhibition speakers to a characteristic vector space of a collated voice;

adapting the standard pattern of the candidates of inhibition speakers by using respective mapping function known;

calculating likelihood between the adapted standard pattern of the candidates of inhibition speakers and the featured vector;

selecting inhibition speakers;

calculating a likelihood of inhibition speakers based on the likelihood between the selected standard pattern of inhibition speakers and the collated voice;

calculating the likelihood of the identical person based on the likelihood between the standard pattern of the identical person and the collated vector;

calculating a likelihood of normalization by subtracting said likelihood of inhibition speakers from said likelihood of the identical person; and deciding the person based on the likelihood of normalization.

16. A computer readable memory medium for storing a program for recognizing a speaker, said program comprising:

acquiring a mapping function from a characteristic vector space of normalized standard patterns of all candidates of inhibition speakers to a characteristic vector space of the normalized collated voice;

adapting the standard pattern of the candidates of inhibition speakers by using the mapping function acquired;

selecting inhibition speakers by acquiring likelihood between the adapted standard pattern of the candidates of inhibition speakers and the featured vector;

calculating a likelihood of inhibition speakers based on the likelihood between the selected standard pattern of inhibition speakers and the collated voice;

calculating the likelihood of the identical person based on the likelihood between the normalized standard pattern of the identical person and the normalized collated vector;

calculating a likelihood of normalization by subtracting said likelihood of inhibition speakers from said likelihood of the identical person; and deciding the person based on the likelihood of normalization.

* * * * *